G. W. SWOPE & W. N. BELL.
TOOTH CLEANING INSTRUMENT.
APPLICATION FILED APR. 19, 1913.

1,083,770.

Patented Jan. 6, 1914.

Witnesses.

Inventors.
George Washington Swope
William Napoleon Bell

UNITED STATES PATENT OFFICE.

GEORGE WASHINGTON SWOPE AND WILLIAM NAPOLEON BELL, OF NORFOLK, VIRGINIA.

TOOTH-CLEANING INSTRUMENT.

1,083,770.     Specification of Letters Patent.     Patented Jan. 6, 1914.

Application filed April 19, 1913. Serial No. 762,416.

*To all whom it may concern:*

Be it known that we, GEORGE W. SWOPE, of Manteo street, and WILLIAM N. BELL, of Camp avenue, Norfolk, Virginia, have invented a new and useful Tooth-Cleaning Instrument, of which the following is a specification.

Our invention relates to the preservation of the teeth and to the process of removing from between the teeth any foreign matter gotten there through the process of masticating food by means of floss silk thread, and has for its object to render the process more expeditious and therefore more practicable. We attain this object by the mechanism illustrated in the accompanying drawing, in which—

Figure 1:
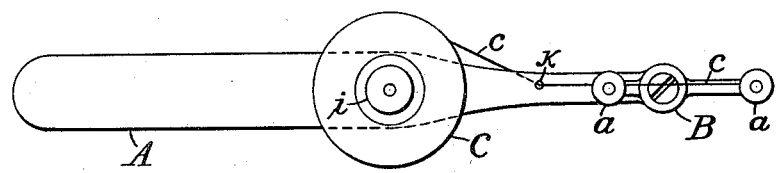
Figure 2:
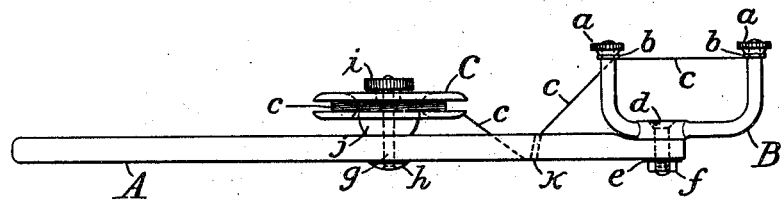
Figure 3:
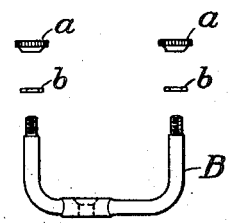

Figure 1 is a top view of the instrument as it appears with the "floss silk carriage" turned toward the observer; Fig. 2 is a side view of the instrument with the "floss silk carriage" resting uprightly on the handle; and Fig. 3 a detailed view in perspective of the "floss silk holder."

Similar letters refer to similar parts throughout the several views.

The handle "A" is made much like the ordinary tooth-brush handle, tapering toward the end supporting the "floss silk holder", and has attached thereto on the top and midway between its two ends the floss-silk spool of thread, marked "C." At its farthest and smallest end is attached the said "floss silk holder", marked "B" by means of a metal attachment of the same metal as that of which the said holder is made, marked "d", indicating the bolt, and marked "e" and "f" indicating the washer and nut respectively. Midway between the spool and the "floss silk holder" is a small aperture for the passage of the floss silk, marked "k." The passing of the floss through the perforation k has the advantage of keeping the thread in a better adjustment and holding the thread back from the lip, thus adding to the neatness and the sanitation of the invention.

The spool of floss silk, marked "C", is attached to the handle by means of a small metal rod or bolt marked "g", which bolt is fastened by means of a flattened head marked "h" and a nut marked "i." The said spool is slightly lifted from the handle to avoid friction by a small contrivance, shaped like a washer, and made of the same material as the handle, marked "j."

The "floss silk holder", attached as above described and marked "B" consists of one base and two upright ends made of one piece of metal, at the top of each upright end is a washer, marked "b" and on top of the washer is a nut marked "a", this contrivance is for the holding of the thread as will be explained hereafter, as follows: To thread the instrument, or machine, the floss silk marked "c" is drawn from the spool marked "C", is passed around to the opposite side of the handle and drawn through the small aperture in the handle marked "k", is then drawn once around the first upright end of the "floss silk holder" "B" between the washer "b" and the shoulder of the upright end, it is then drawn once around the farther upright end of the "floss silk holder" "B" between the washer "b" and the shoulder of the said upright end, it is then held by the fingers while the nut "a" is screwed down, pressing the silk thread tightly between the washer and the shoulder, the washer saving the thread from friction in turning the nut. Next the spool "C" is turned backward making taut the thread "c", while thus held the nut "a" is screwed down, pressing the silk thread tightly between the washer and the shoulder, the washer also saving the thread from friction in turning the nut. The spool is then released and the thread outside of the carriage "B" made slack. The thread "c" within the carriage "B" is now held tight and will break before much slack is allowed.

The lengths of the two arms of the holder are in the ratio of two to three,—the longer arm which extends farther into the mouth when the device is in use, being one-half longer than the other arm. The advantage of having this arm longer is the reduction of the length of the handle that must be inserted into the mouth, while there is nevertheless provided a sufficient length of floss for cleaning the teeth.

The instrument, or machine, can be used for any of the teeth within the mouth, the "floss silk holder" being easily and quickly turned and adjusted by the fingers. The threading of the "floss silk holder" can easily be accomplished in a half minute. This invention makes the use of floss silk as easy for the back molar or even wisdom teeth as for the front teeth. In place of holding the floss silk with the fingers of the two hands, placing the fingers of one hand within the mouth and thus awkwardly forcing the thread between the teeth (an extremely difficult feat for the back teeth), we place the floss silk thread in the "floss silk holder" as above fully set forth and as is fully shown in the accompanying drawing forming a part hereof. The handle will be made of celluloid, bone, or German silver as desired by the purchaser.

We claim:

1. In a device of the kind described, a handle, a spool holder mounted on one side thereof, dental floss holding means rotatably mounted on the same side of the handle as the spool-holder and spaced therefrom, the handle being transversely perforated between said spool-holder and said means to provide a retaining guide for the floss.

2. In a device of the kind described, a spool of dental floss mounted on one side thereof, floss-holding uprights mounted on the same side of the handle as the spool, there being a perforation extending from side to side of said handle between said spool and said uprights, a length of dental floss extending from said spool around the handle to the opposite side thereof, thence through said perforation, thence to said uprights whereon it is secured.

3. In a device of the kind described, a handle, a floss-holding yoke mounted on said handle, said yoke comprising a base, means for attaching said base to said handle, arms extending from opposite sides of said base, the arm on one side being shorter than the arm on the other side, uprights on the outer end of each arm and means on the uprights for holding a strand of dental floss between them.

GEORGE WASHINGTON SWOPE.
WILLIAM NAPOLEON BELL.

Witnesses:
J. H. SHUMADINE,
J. O. SHUMADINE.